United States Patent [19]
Saidi

[11] Patent Number: 5,532,082
[45] Date of Patent: Jul. 2, 1996

[54] SOLID ELECTROLYTES CONTAINING TETRABUTYL AMMONIUM THIOCYANATE AND ELECTROCHEMICAL CELLS PRODUCED THEREFROM

[76] Inventor: Eileen S. Saidi, 492 Capitol Village Cir., San Jose, Calif. 95136

[21] Appl. No.: 267,067

[22] Filed: Jun. 27, 1994

[51] Int. Cl.[6] .................................................. H01M 6/18
[52] U.S. Cl. ........................................... 429/192; 429/198
[58] Field of Search ..................................... 429/192, 198

[56] References Cited

U.S. PATENT DOCUMENTS

| | | | |
|---|---|---|---|
| 3,852,113 | 12/1974 | Yokota et al. | 136/83 |
| 4,160,070 | 7/1979 | Margalit et al. | 429/194 |
| 4,948,490 | 8/1990 | Venkatasetty | 429/198 |
| 5,057,565 | 10/1991 | Noding et al. | 524/109 |
| 5,204,196 | 4/1993 | Yokomichi et al. | 429/192 |
| 5,262,253 | 11/1993 | Golovin | 429/192 |

*Primary Examiner*—Prince Willis, Jr.
*Assistant Examiner*—Carol Chaney

[57] ABSTRACT

Solid electrolytes containing a source of lithium cations and a source of thiocyanate anions and methods for preparing electrolytic cells from such solid electrolytes are provided. Preferably the solid electrolyte includes $LiPF_6$ and $[CH_3(CH_2)_3]_4 NSCN$. The tetrabutyl ammonium cation also acts as a surfactant which improves the coatability of the electrolyte mixture prior to being cured. The thiocyanate anion improves the lithium plating process by adsorbing onto and modifying the lithium anode surface.

16 Claims, 2 Drawing Sheets

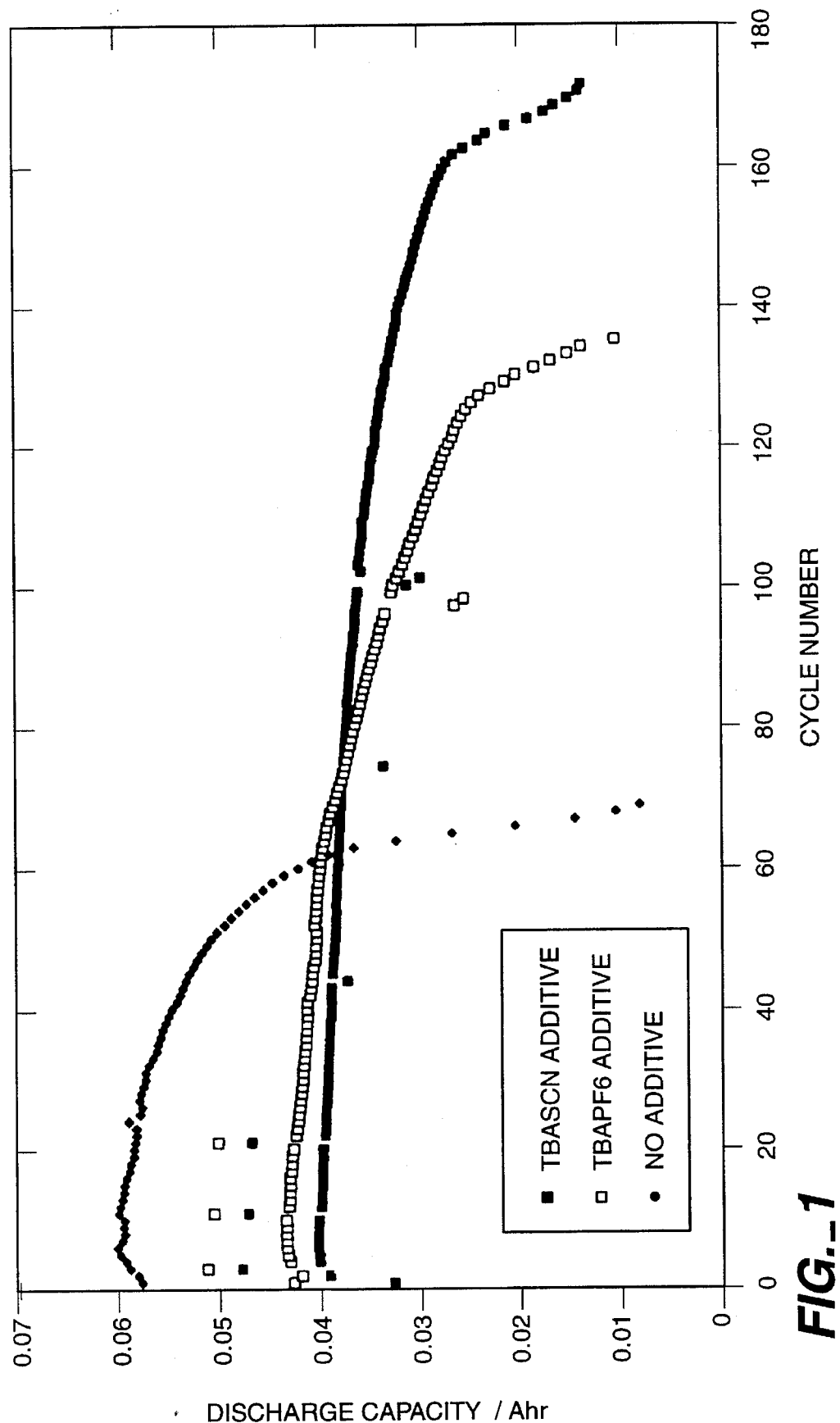
FIG._1

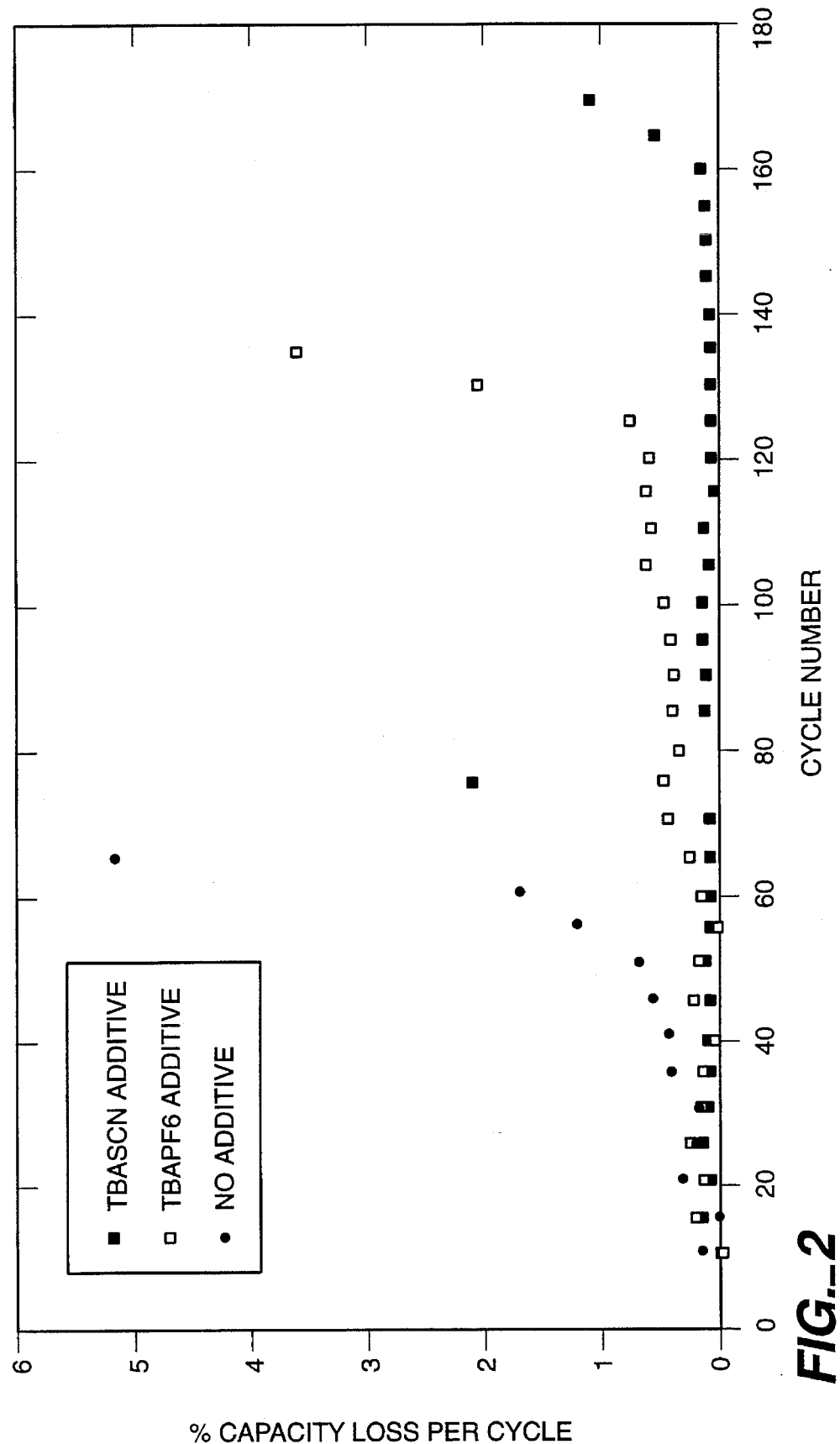
FIG._2

SOLID ELECTROLYTES CONTAINING TETRABUTYL AMMONIUM THIOCYANATE AND ELECTROCHEMICAL CELLS PRODUCED THEREFROM

BACKGROUND OF THE INVENTION

1. Field of the Invention

This invention is directed to solid electrolytes containing tetrabutyl ammonium thiocyanate and a source of lithium ions and to solid electrolytic cells (batteries) comprising such solid electrolytes. This invention is also directed to methods for improving the coatability of electrolyte solutions prior to curing and for enhancing the cumulative capacity of the solid electrolytic cells by employing a solid electrolyte which contains tetrabutyl ammonium thiocyanate.

2. State of the Art

Electrolytic cells containing a lithium (or lithium based metal) anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features. Notwithstanding these advantages, the use of these solid batteries over repeated charge/discharge cycles is substantially impaired because these batteries often quickly lose their charge and discharge capacity after repeated cycles as compared to their initial charge and discharge capacity. Moreover, electrolytes are often difficult to handle in the manufacturing process of the solid batteries.

Solid electrolytic (or electrochemical) cells employ a solid electrolyte interposed between a cathode and an anode. The solid electrolyte contains either an inorganic or an organic matrix as well as a suitable inorganic ion salt. The inorganic matrix may be non-polymeric [e.g, β-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Because it is expensive and difficult to form inorganic nonpolymeric matrices into different configurations, they are generally not preferred and the art typically employs a solid electrolyte containing a polymeric matrix. The solid electrolytes also contain an inorganic ion salt and a solvent (plasticizer) which is typically added to the matrix in order to enhance the solubility of the inorganic ion salt in the solid electrolyte and thereby increase the conductivity of the electrolytic cell.

One method of forming a solid, solvent containing electrode is to combine the monomer or partial polymer of the polymeric matrix to be formed with appropriate amounts of the inorganic ion salt and the solvent. This electrolytic mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte. One problem often encountered is that the electrolytic mixture is difficult to coat. This can result in a layer of solid electrolyte that does not have uniform thickness, does not completely cover the substrate, or has thin spots.

When the solid electrolyte is formed on a cathodic surface, an anodic material can then be laminated onto the solid electrolyte to form a solid electrolytic cell. In operation, even though the initial capacity of the cell (or battery) can be relatively high, nevertheless, such solid batteries often exhibit rapid decline in capacity over their cycle life.

The cumulative capacity of a solid battery is the summation of the capacity of a solid battery over each cycle (charge and discharge) in a specified cycle life. Solid batteries having a high initial capacity but which rapidly lose capacity over the cycle life will have low cumulative capacity which interferes with the effectiveness of these batteries for repeated use.

One reason for the capacity loss is that metallic lithium is reactive with a variety of materials (including materials employed in the solid electrolyte) and thus tends to form "dynamic" passifying films on the surface of the anode. In this regard, such films are termed "dynamic" because they are repeatedly formed and "broken through" during successive cycles. These films must, in fact, be "broken through" with the expenditure of energy in order to allow cycling of the lithium in the system. This reduces the efficiency of the electrochemical cells. In addition to this undesirable use of cell energy, such films are further disadvantageous because they promote the formation of lithium dentrites which can ultimately result in shorting of the electrolytic cell.

In view of the above, the art is searching for methods to enhance the cumulative capacity of such solid electrolytic batteries. In addition, there is a need for electrolytic mixtures with improved coatability.

SUMMARY OF THE INVENTION

The present invention is directed, in part, to the discovery that the addition of tetrabutyl ammonium thiocyanate to an electrolytic mixture comprising a source of lithium ions, e.g., $LiPF_6$, forms an electrolyte composition that exhibits improved coatability. Without being limited to any theory, it is believed that the tetrabutyl ammonium cation acts as a surfactant thereby facilitating coatability of the electrolyte composition. Moreover, the solid, solvent-containing electrolyte formed therefrom has thiocyanate ions which adsorb onto the anode lithium metal surface to inhibit the formation of "dynamic" passivation films during repeated charge/discharge cycles which, in turn, enhances the cumulative capacity of the electrolytic cell.

Accordingly, in one of its composition aspects, this invention is directed to a solid, solvent-containing electrolyte which comprises:

a solid polymeric matrix;

a suitable solvent;

a source of lithium cations; and a source of thiocyanate anions.

In another of its composition aspects, the present invention is directed to an electrolytic cell which comprises:

a lithium anode;

a cathode containing a compatible cathodic material; and interposed therebetween a solid solvent-containing electrolyte which comprises:

a solid polymeric matrix;

a suitable solvent;

a source of lithium cations; and a source of thiocyanate anions.

In a preferred embodiment, the source of thiocyanate anions is tetrabutyl ammonium thiocyanate and the source of lithium cations is $LiPF_6$.

In one of its method aspects, the present invention is directed to a method for enhancing the cumulative capacity of an electrolytic cell that includes a lithium anode, a cathode containing a compatible cathodic material, and interposed therebetween a solid solvent-containing electrolyte, which method comprises:

(a) selecting a solid solvent-containing electrolyte which comprises:
   a solid polymeric matrix;
   a suitable solvent;
   a source of lithium cations;
   a source of thiocyanate anions; and (b) employing the selected solid solvent-containing electrolyte in said electrolytic cell.

In another of its method aspects, the invention is directed to a method of preparing an electrolytic cell comprising an anode, a cathode containing a compatible cathodic material; and interposed therebetween a solid solvent-containing electrolyte, wherein said solid solvent-containing electrolyte is formed by curing an electrolytic mixture after being coated onto either the anode or cathode, which method comprises:

adding a source of tetrabutyl ammonium anions to said electrolytic mixture prior to coating said electrolytic mixture onto said anode or cathode;

curing said electrolytic mixture to form a solid solvent-containing electrolyte on said anode or said cathode; and completing fabrication of said electrolytic cell.

BRIEF DESCRIPTIONS OF THE DRAWINGS

FIG. 1 illustrates the discharge capacity versus cycle number for several different electrolytic cells.

FIG. 2 illustrates the percentage of loss discharge capacity/cycle versus cycle number for several different electrolytic cells.

DETAILED DESCRIPTION OF THE PREFERRED EMBODIMENTS

This invention is directed to solid, solvent-containing electrolytes which, by virtue of the salts employed, provide for enhanced cumulative capacity when used in a solid battery. Moreover, the employment of tetrabutyl ammonium in the electrolytic mixture has a surfactant effect which improves the mixture's coatability. However, prior to describing this invention is further detail, the following terms will first be defined.

Definitions

As used herein, the following terms have the following meanings.

The term "solid, secondary electrolytic cell" or "solid, secondary electrochemical cell" refers to a composite electrolytic cell comprising a lithium anode, a solid, solvent-containing electrolyte and a cathode comprising a cathodic material capable of repeated discharge/charge cycles so as to permit repeated reuse wherein the electrolyte is interposed between the anode and the cathode.

The solid, solvent-containing electrolyte comprises an electrolytic solvent, an alkali salt, and a solid polymeric matrix.

The term "electrolytic solvent" (or "electrolyte solvent") refers to the solvent (i.e., plasticizer) included in the composite electrode and the electrolyte for the purpose of solubilizing alkali salts during operation of the electrolytic cell and which also act as a plasticizer. The solvent can be any low volatile aprotic polar solvent. Preferably, these materials are characterized by a boiling point greater than about 85° C. In this regard, low volatility for the electrolytic solvent simplifies manufacture of the electrolyte and improves the shelf-life of the resulting battery.

If the solid matrix forming monomer or partial polymer thereof employed in either the solid solvent-containing electrolyte or the composite electrode (cathode or anode) is cured or further cured by radiation polymerization to form the solid matrix, then the solvent should be radiation inert at least up to the levels of radiation employed. If the solid matrix forming monomer or partial polymer thereof is cured or further cured by thermal polymerization, then the solvent should be thermally inert at least up to the temperatures of thermal polymerization. Additionally, the solvent should not scavenge free radicals.

Representative examples of suitable electrolytic solvents include, by way of example, propylene carbonate, ethylene carbonate, γ-butyro-lactone, tetrahydrofuran, glyme (dimethoxyethane), diglyme, triglyme, tetraglyme, dimethylsulfoxide, dioxolane, sulfolane and the like, and mixtures thereof. A preferred solvent is a mixture of an organic carbonate and triglyme, with a 4:1 weight ratio mixture of propylene carbonate:triglyme being particularly preferred, as disclosed in U.S. patent application Ser. No. 07/918,509 filed on Jul. 22, 1992 which application is incorporated herein by reference in its entirety.

The term "alkali salt" refers to those salts wherein the cation of the salt is an alkali selected from the group consisting of lithium, sodium, potassium, rubidium and cesium which salts are suitable for use in the solid, solvent-containing electrolyte and in the composite electrodes of an electrolytic cell. The particular alkali salt employed is not critical and examples of suitable alkali salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The alkali is preferably selected from the group consisting of lithium, sodium, potassium, and cesium. Lithium salts are preferred since they are also a source of lithium cations.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical.

Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253 and incorporated herein by reference), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones.

Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "lithium containing anode" refers to anodes comprising lithium, including, by way of example, metallic lithium, lithium alloys, such as alloys of lithium with aluminum, mercury, zinc, and the like, and intercalation based anodes containing lithium such as those based on carbon, tungsten oxides, and the like.

The cathode comprises a compatible cathodic material which refers to any material which functions as a positive pole (cathode) in a solid, secondary electrolytic cell and which is capable of being recharged (recycled) and which, when employed with the lithium containing anode, provides a fabricated electrolytic cell potential of at least about 2 volts. Such compatible cathodic materials are well known in the art and include, by way of example, manganese dioxide, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The particular compatible cathodic material employed is not critical.

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial polymer thereof.

Methods for preparing solid electrolytes and electrolytic cells are also set forth in U.S. Pat. Nos. 4,830,939 and 4,925,751 which are incorporated herein by reference in their entirety.

The term "battery" refers to two or more electrochemical cells electrically interconnected in an appropriate series/parallel arrangement to provide the required operating voltage and current levels.

The term "cycle life" refers to the number of discharge/charge cycles which can be conducted on an electrolytic cell before that cell is no longer able to maintain a capacity in the charged state equal to at least 50% of its charged capacity after fabrication.

The term "source of thiocyanate anions" refers to any salt containing thiocyanate as the anion and preferably to LiSCN, NaSCN, TBASCN, NH₄SCN, and KSCN. Tetrabutyl ammonium thiocyanate (TBASCN) [CH$_3$(CH$_2$)$_3$]$_4$NSCN is the preferred source.

The term "discharge capacity" or "capacity" of the cell refers to the total amount of charge the fully charged battery can discharge to a certain final cell voltage. It is measured in ampere-hours. It is a measure of the useful charge in the battery. The initial capacity is that measured during the first full cycle of the cell. A comparison of the average cycle capacity to that of the initial cycle provides a measure of how well the cell maintains a constant capacity over repeated cycles.

The "recharge ratio" refers to the charge capacity to discharge capacity ratio of electrochemical cell or battery. Ideally, the recharge ratio should be unity in each cycle, indicating that there are no irreversible reactions in the cell.

The term "cycle" refers to the consecutive charge/discharge steps. The ability of the cell or battery to maintain a useful capacity for many cycles indicates the useful life of the cell or battery.

Methodology

Methods for preparing solid, solvent-containing electrolytes are well known in the art. This invention, however, utilizes an inorganic salt mixture comprising a source of thiocyanate anions (SCN⁻) and a source of lithium anions in the solid, solvent-containing electrolyte. It is believed that the SCN⁻ anions adsorb onto the surface of the lithium anode. The presence of the SCN⁻ on the surface modifies lithium plating thereby reducing lithium isolation and inhibiting the rate of dentrite formation. The result is that lithium is plated onto the anode surface more evenly. A preferred source of thiocyanate is tetrabutyl ammonium thiocyanate and a preferred source of lithium cations is LiPF$_6$. Solid electrolytic cells employing the above inorganic salt mixture in the solid electrolyte exhibit improved cumulative capacity.

The use of tetrabutyl ammonium thiocyanate also improves the coatability of the electrolyte mixture prior to being cured. The tetrabutyl ammonium apparently acts as a surfactant which results in more uniform electrolyte coatings on either the anode or cathode surface and fewer thin spots in the solid electrolyte where the anode and cathode can come into accidental contact to cause short circuiting.

The electrolyte composition typically comprises from about 5 to about 25 weight percent of the alkali salt based on the total weight of the electrolyte; preferably, from about 10 to 20 weight percent; and even more preferably from about 10 to about 15 weight percent.

Preferably, the tetrabutyl ammonium thiocyanate comprises about 2 to about 5 weight percent of the solid solvent-containing electrolyte; more preferably the amount is about 3.9 weight percent.

The electrolyte composition typically comprises from zero to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of the inorganic ion salt. Generally, the amount of the salt is from about 1 to about 25 weight percent. (All weight percents are based on the total weight of the cathode.)

EXAMPLES

The following Example 1 illustrates a method of how an electrolytic cell could be fabricated.

Example 1

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H 19 (99.45 % min. Al), and which is available from All Foils, Inc., Brooklyn Heights, Ohio.

The adhesion promoter layer is prepared as a dispersed colloidal solution in one of two methods. The first preparation of this colloidal solution for this example is as follows:

84.4 parts by weight of carbon powder (Shawinigan Black™—available from Chevron Chemical Company, San Ramon, Calif.)

337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)

578.0 parts by weight of isopropanol

The carbon powder and isopropanol are combined with mixing in a conventional high shear colloid mill mixer (Eberbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightning Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275,300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

In a preferred embodiment of the second method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13}$ [prepared by heating ammonium metavanadate ($NH_4^+VO_3^-$) at 450° C. for 16 hours under $N_2$ flow] and 5.9±1.1 weight percent of carbon (available from AKZO Chemicals, Inc., Chicago, Ill., under the tradename of Ketjen Black EC 600JD™). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. Afterwards, the resulting mixture is passed through a 200 mesh screen and then dried in a vacuum or in an inert gas atmosphere (e.g., argon) to produce a cathode powder with a water content of less than about 1000 ppm.

ii. Cathode Paste

A cathode paste is prepared by combining sufficient cathode powder to provide for a final product having about 53 weight percent $V_6O_{13}$. The paste contains the following (in approximate weight percent):

$V_6O_{13}$ 53%

Carbon 3.7%

4:1 propylene carbonate/triglyme 31.9% polyethylene oxide 2% polyethylene glycol diacrylate 8% ethoxylated trimethylolpropane triacrylate 1.4%

The method of preparing 100 grams of the cathode paste is as follows:

31.9 grams of a solvent having a 4:1 weight ratio of propylene carbonate: triglyme is mixed with 8 grams of polyethylene glycol diacrylate (molecular weight about 400 available as SR-344 from Sartomer Company, Inc., Exton, Pa.) and 1.4 grams of ethoxylated trimethylolpropane triacrylate (TMPEOTA) (molecular weight about 450 and available as SR-454 from Sartomer Co., Inc.) in a double planetary mixer (Ross No. 2 mixer, available from Charles Ross & Sons, Co., Hauppage, N.Y.) to form a solvent solution.

53 grams of $V_6O_{13}$, 3.7 grams of carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45° C. until applied onto the current collector. The so-prepared cathode paste can be placed onto the adhesion layer of the current collector by extrusion at a temperature of from about 45° to about 48° C. The extruded cathode paste is then spread to a substantially uniform thickness of about 50–120 microns over the current collector by a comma bar.

C. Electrolyte 58.00 grams of propylene carbonate, 14.50 grams of triglyme, and 11.04 grams of urethane acrylate (Actilane SP023, available from Akcros Chemicals, Ltd., Manchester, United Kingdom) are combined at room temperature until homogeneous. 3.88 grams TBASCN are added to this premix. The resulting solution is optionally passed through a column of 4A molecular sieves to remove water.

At this point, 2.75 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.83 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C.

In one optional embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount (g) | Weight Percent[a] |
|---|---|---|
| Propylene Carbonate | 58.00 | 58.00 |
| Triglyme | 14.50 | 14.50 |
| Urethane Acrylate | 11.04 | 11.04 |
| $LiPF_6$ | 9.83 | 9.83 |
| TBASCN | 3.88 | 3.88 |
| PEO Film Forming Agent | 2.75 | 2.75 |
| Total | 100 g | 100 |

[a]= weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent, the TBASCN and the $LiPF_6$ salt, is filtered to remove any solid particles or gels remaining in the solution. One suitable filter device is a sintered stainless steel screen having a pore size between 1 and 50 microns at 100% efficiency.

In the alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and triglyme before adding the TBASCN. Then dry the solution over 4A molecular sieves (Grade 514, 8–12 Mesh from Schoofs Inc., Moraga, Calif.) and then proceed to step 4.
2. Dry the propylene carbonate and triglyme over 4A molecular sieves (Grade 514, 8–12 Mesh from Schoofs Inc., Moraga, Calif.).
3. At room temperature, <30° C., add the urethane acrylate to the solvent prepared in step 2. Stir at 300 rpm until the resin is completely dissolved. The solution should be clear and colorless. Next add the TBASCN.
4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).
5. After final addition of the polyethylene oxide film forming agent, stir an additional 30 minutes to ensure that the film forming agent is substantially dispersed.
6. Heat the mixture to 68° C. to 75° C. and stir until the film forming agent has melted and the solution has become transparent and may be light yellow in color. Optionally, in this step, the mixture is heated to 65° C. to 68° C.
7. Cool the solution produced in step 6 and when the temperature of the solution reaches 40° C., add the $LiPF_6$ salt very slowly making sure that the maximum temperature does not exceed 55° C. and preferably does not exceed about 40° C.
8. After the final addition of the $LiPF_6$ salt, stir for an additional 30 minutes, degas, and let sit overnight and cool.
9. Filter the solution through a sintered stainless steel screen having a pore size between 1 and 50 microns at 100% efficiency.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte laminated to a solid cathode which is affixed to a current collector.

D. Anode

The anode comprises a sheet of lithium foil (about 50 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

Examples 2–5

Four electrolytic cells were prepared using four different solid, solvent-containing electrolytes. These electrolytes were prepared substantially as described above in Example 1. The composition (i.e., weight % of each component) of four solid electrolytes is shown in Table I.

TABLE I

| | Ex. 2 | Ex. 3 | Ex. 4 | Ex. 5 |
|---|---|---|---|---|
| Propylene Carbonate | 58.00 | 58.00 | 58.40 | 58.40 |
| Triglyme | 14.50 | 14.50 | 14.60 | 14.60 |
| Urethane Acrylate | 12.77 | 11.04 | 12.05 | 11.40 |
| $LiPF_6$ | 9.83 | 9.83 | 9.45 | 9.45 |
| Tetrabutyl Ammonium Thio- | 2.00 | 3.88 | 2.50 | 3.50 |

TABLE I-continued

|  | Ex. 2 | Ex. 3 | Ex. 4 | Ex. 5 |
|---|---|---|---|---|
| cyanate (TBASCN) | | | | |
| Poly(ethylene) oxide MW 600,00 | 2.90 | 2.75 | 3.00 | 2.65 |
|  | 100.00% | 100.00% | 100.00% | 100.00% |

It was found that of these four examples the electrolytic cell of Ex. 3 having a solid solvent-containing electrolyte comprising 3.88% TBASCN provided the best performance.

Comparative Example

The purpose of this example is to compare the performance of an electrolytic cell of this invention (Ex. 3) with a baseline electrolytic cell (without added TBASCN) and with a salt different from TBASCN. Specifically, the discharge capacity v. cycle number (FIG. 1) and percentage capacity loss per cycle v. cycle number (FIG. 2) for two electrolytic cells were measured and compared to the same measurements from an electrolytic cell having a conventional (or "baseline") electrolytic composition. The baseline composition (in wt. %) comprised: 60.19% propylene carbonate, triglyme% 14.50, urethane acrylate 11.93%, polyethylene oxide 2.75%, and LiPF$_6$ 9.83%. The first electrolytic cell that was tested and compared to baseline was as depicted in Ex. 3 above. The second electrolytic cell tested and compared to baseline had the same composition as the cell of Ex. 3 except that 3.88% tetrabutyl ammonium hexafluorophosphate (TBAPF$_6$) was used instead of 3.88% of TBASCN.

As is apparent from FIGS. 1 and 2, the first and second electrolytic cells both demonstrated significantly better cycling performance and less capacity decline relative to the cell with the baseline composition. The electrolytic cell employing TBASCN performed significantly better than the cell using TBAPF6 instead.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the following claims.

What is claimed is:

1. A solid solvent-containing electrolyte which comprises:
    a solid polymeric matrix;
    a suitable-electrolytic solvent;
    a source of lithium cations; and
    a source of thiocyanate anions, said source of thiocyanate anions being tetrabutyl ammonium thiocyanate.

2. The solid solvent-containing electrolyte of claim 1 wherein said tetrabutyl ammonium thiocyantate comprises about 2 to about 5 weight percent of said solid solvent-containing electrolyte.

3. The solid solvent-containing electrolyte of claim 2 wherein said source of lithium cations comprises LiPF$_6$.

4. An electrolytic cell which comprises:
    a lithium-containing anode;
    a cathode; and
    interposed therebetween a solid solvent-containing electrolyte which comprises:
    a solid polymeric matrix
    a suitable electrolytic solvent;
    a source of lithium cations; and
    a source of thiocyanate anions, said source of thiocyanate anions being tetrabutyl ammonium thiocyanate.

5. The electrolytic cell of claim 4 wherein said source of lithium cation comprises LiPF$_6$.

6. A method for preparing an electrolytic cell which comprises a lithium-containing anode, a cathode, and interposed therebetween a solid solvent-containing electrolyte, which method comprises:
    (a) selecting a solid solvent-containing electrolyte which comprises:
        a solid polymeric matrix;
        a suitable electrolytic solvent;
        a source of lithium cations;
        a source of thiocyanate anions, said source of thiocyanate anions being tetrabutyl ammonium thiocyanate; and
    (b) employing the selected solvent-containing electrolyte in said electrolytic cell.

7. The method of claim 6 wherein said tetrabutyl ammonium thiocyanate comprises from about 2 to about 5 weight percent of said solid solvent-containing electrolyte.

8. The method of claim 7 wherein the source of lithium cations in said selected solid solvent-containing electrolyte comprises LiPF$_6$.

9. The method of claim 6 wherein the lithium-containing anode is an intercalation based anode comprising carbon.

10. The method of claim 9 wherein the cathode comprises materials selected from the group consisting of vanadium oxides, LiCoO$_2$, LiMnO$_2$, and mixtures thereof.

11. The method of claim 6 wherein the cathode comprises materials selected from the group consisting of vanadium oxides, LiCoO$_2$, LiMnO$_2$, and mixtures thereof.

12. A method of preparing an electrolytic cell comprising a lithium-containing anode, a cathode; and interposed therebetween a solid solvent-containing electrolyte, wherein said solid solvent-containing electrolyte is formed by curing an electrolytic mixture after being coated onto either the anode or the cathode, which method comprises:
    adding a source of thiocyanate anions, said source of thiocyanate anions being tetrabutyl ammonium thiocyanate, to said electrolytic mixture prior to coating it onto said anode or cathode; curing said electrolytic mixture to form a solid solvent-containing electrolyte on said anode or said cathode; and completing fabrication of said electrolytic cell.

13. The method of claim 12 wherein the step of adding said source of tetrabutyl ammonium thiocyanate comprises mixing tetrabutyl ammonium thiocyanate to said electrolytic mixture so that after curing said tetrabutyl ammonium thiocyanate comprises about 2 to about 5 weight percent of said electrolyte.

14. The method of claim 12 wherein the lithium-containing anode is an intercalation based anode comprising carbon.

15. The method of claim 14 wherein the cathode comprises materials selected from the group consisting of vanadium oxides, LiCoO$_2$, LiMnO$_2$, and mixtures thereof.

16. The method of claim 12 wherein the cathode comprises materials selected from the group consisting of vanadium oxides, LiCoO$_2$, LiMnO$_2$, and mixtures thereof.

* * * * *